United States Patent [19]
Duggal et al.

[11] Patent Number: 5,867,356
[45] Date of Patent: Feb. 2, 1999

[54] CURRENT LIMITING SYSTEM AND METHOD

[75] Inventors: Anil Raj Duggal, Niskayuna; John Norton Park, Rexford; William Newell Schultz; Minyoung Lee, both of Niskayuna, all of N.Y.

[73] Assignee: General Electric Company, Schenectady, N.Y.

[21] Appl. No.: 964,595

[22] Filed: Nov. 5, 1997

[51] Int. Cl.$^6$ .............................. H01H 9/56; G05F 1/12
[52] U.S. Cl. ............................................. 361/13; 323/293
[58] Field of Search .................................. 323/220, 233, 323/293; 361/3, 8, 10, 13

[56] References Cited

U.S. PATENT DOCUMENTS

| | | | |
|---|---|---|---|
| 3,648,002 | 3/1972 | Du Rocher | 200/166 C |
| 4,101,862 | 7/1978 | Takagi et al. | 338/23 |
| 4,107,640 | 8/1978 | Asano et al. | 338/23 |
| 4,583,146 | 4/1986 | Howell | 361/13 |
| 4,652,962 | 3/1987 | Howell | 361/3 |
| 4,700,256 | 10/1987 | Howell | 361/13 |
| 4,890,186 | 12/1989 | Matsubara et al. | 361/103 |
| 5,428,195 | 6/1995 | Arnold | 218/1 |
| 5,602,520 | 2/1997 | Baiatu et al. | 338/22 R |
| 5,629,658 | 5/1997 | Chen | 335/201 |
| 5,650,901 | 7/1997 | Yamamoto | 361/8 |
| 5,726,843 | 3/1998 | Arita et al. | 361/5 |
| 5,726,848 | 3/1998 | Boenig | 361/93 |

FOREIGN PATENT DOCUMENTS

| | | |
|---|---|---|
| 0640995 | 3/1995 | European Pat. Off. . |
| 0713227 | 5/1996 | European Pat. Off. . |
| 4330607 | 3/1995 | Germany . |
| 9112643 | 8/1991 | WIPO . |
| 9410734 | 5/1994 | WIPO . |

*Primary Examiner*—Matthew Nguyen
*Attorney, Agent, or Firm*—Ernest G. Cusick; Noreen C. Johnson

[57] ABSTRACT

A current limiting system for a circuit limits current flow through the system. The current limiting system comprises at least one main switch comprising first and second main switch contacts and a contactor connecting the first and second main switch contacts; at least one current limiting device and at least one solid-state switch, which are mechanically unconnected to the main switch, and the at least one current limiting device and least one solid-state switch are arranged in series on a series side of the circuit; the at least one main switch is on a main switch side of the circuit arranged in parallel with the series side; a control that senses a predetermined condition of the circuit, and operably connected with the at least one solid state switch to open and it. Under normal operating conditions, most current flows through the at least one main switch side. When the predetermined condition causes the main switch to open, and the resistance increases in a main switch side. Thus, current flows to the series side of the circuit side. The current limiting device then switches its state from a low resistance to a high resistance state to limit the current passing through the current limiting system, where the control has sensed a predetermined condition and signals the solid-state switch to open, thereby interrupting current flow through of the current limiting system.

17 Claims, 2 Drawing Sheets

CURRENT LIMITING SYSTEM AND METHOD

FIELD OF THE INVENTION

This invention relates to current limiting systems. In particular, the invention relates to current limiting systems for general circuit protection including electrical distribution and motor control applications. The current limiting systems are capable of limiting the current in a circuit when a high current event or high current condition occurs.

DESCRIPTION OF RELATED ART

Current limiting systems often comprise current limiting circuit breakers. The current limiting circuit breakers are designed to limit a peak circuit current and pass-through energy, as the current limiting circuit breakers open in response to a fault condition. Current limiting circuit breakers rely upon at least one of a relatively fast contact opening speed and an efficient transfer of arc, where the arc develops during the opening of the contacts. Currently, known current limiting circuit breakers do not permit limiting of a peak current or pass-through energy that is sufficient for many circuit protection applications as needed for today's quick action and high speed applications.

Known current limiting arrangements are disclosed in, U.S. Pat. No. 5,428,195 that discloses a current limiting device in series with main contacts in a switch where the current limiting system comprises a current limiting device with a positive temperature coefficient (PTC) material (described hereinafter) and U.S. Pat. No. 5,629,658 that discloses a main pair of mechanical contacts in a switch that is in parallel with a series combination of a secondary pair of mechanical contacts of a secondary switch and a current limiting device with a positive temperature coefficient material current limiting device. In U.S. Pat. No. 5,629,658, the two pairs of contacts in the two switches must be mechanically associated with each other, and in such communication and cooperation that the main pair of contacts is the first pair of contacts to open.

Another current limiting arrangement is disclosed in, U.S. Pat. No. 5,650,901 to Yamamoto. Yamamoto discloses a current limiting device in series with main contacts in a switch where the current limiting system comprises a current limiting device. The current limiting device is an air core reactor, and thus has a constant current limiting capability. The air core reactor does not exhibit a varying current limiting capability, and thus does not act to limit variances in alternating current.

As known in the art, mechanical contacts and their switches, especially those in current limiting arrangements where a plurality of switches are mechanically associated with each other, do not provide a sufficient amount of control, are unable to be fine tuned for quick and reliable opening in response to discrete and minute differential opening conditions, and are also subject to arcing, sticking, arcing residue, wear related mechanical breakdowns and other such problems.

SUMMARY OF THE INVENTION

Accordingly, it is desirable to provide a current limiting system, where the current limiting device overcomes the above noted, and other, disadvantages of the related art.

Therefore, it is desirable to provide a current limiting system for a circuit that limits current flow through the system during an overcurrent event. The current limiting system comprises at least one main switch comprising first and second main switch contacts and a contactor connecting the first and second main switch contacts; at least one current limiting device and at least one solid-state switch, which are mechanically unconnected to the main switch. The at least one current limiting device and at least one solid-state switch are arranged in series on a series side of the circuit. The at least one main switch is on a main switch side of the circuit arranged in parallel with the series side. A control that senses a predetermined condition of the circuit, and is operably connected with the at least one solid state switch to open it. Under normal operating conditions, most current flows through the at least one main switch side. When the predetermined condition is sensed by the control the main switch opens, and a gap is formed between the contacts of the main switch. An arc develops between the contacts of the main switch, and the resistance increases in the main switch side. This increase leads to commutation of the current from the main switch side to the solid state switch/current limiting device side.

The commutation of current away from the main switch contacts of the circuit combined with the increasing gap between the contacts of the main switch leads to a rapid extinguishing of the arc between the main switch contacts and an interruption of the current flow through the main switch side of the circuit. Thus, current flows only in the series side of the circuit side. The current limiting device then switches its state from a low resistance to a high resistance state to limit the current passing through the current limiting system, where the control signals the solid-state switch to open, thereby interrupting current flow through the current limiting system.

These and other advantages and salient features of he invention will become apparent from the following detailed description, which, when taken in conjunction with the annexed drawings, disclose embodiments of the invention.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE EMBODIMENTS

Figure 1:
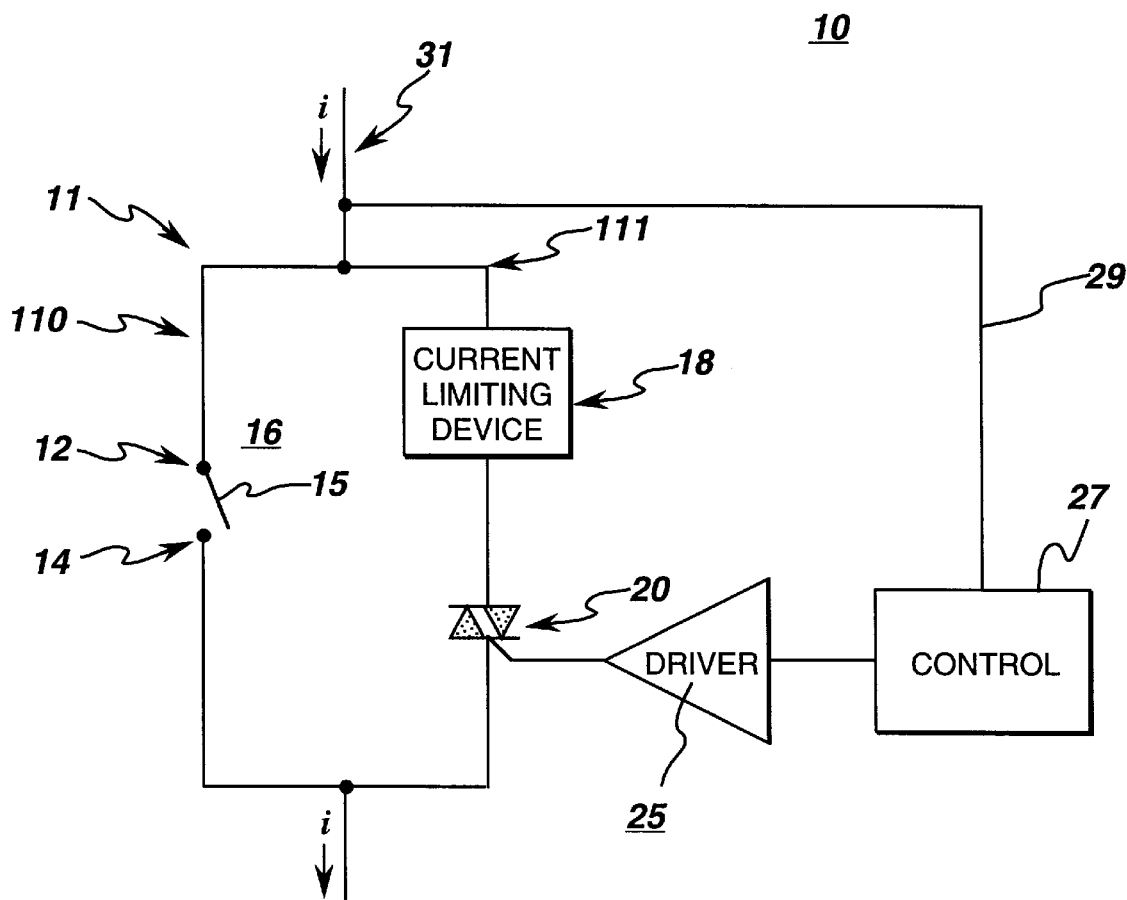
FIG. 1 is a schematic representation of a current limiting system, as embodied by the invention.

A description of the current limiting system, as embodied in the invention, will be discussed with reference to FIG. 1. In FIG. 1, the current limiting system 10 comprises a circuit 11 that is divided into a parallel arrangement. One side 110 of the circuit 11 parallel arrangement comprises a main contact switch 16. The main contact switch 16 comprises main contacts 12 and 14 and a contactor 15. The contactor 15 is movable between an open position, where the one side of the parallel arrangement is open and a closed position where the contactor 15 connects the contacts 12 and 14.

The other side 111 of the parallel arrangement of the circuit 11 comprises a series combination of a current limiting device 18 and a switch 20. The current limiting device 18 preferably comprises a polymer current limiting device, and the switch 20 preferably comprises a solid state switch. The polymer current limiting device 18 comprises at least one of a positive temperature coefficient current limiting device, such as described above in U.S. Pat. No. 5,428,195, and a polymer current limiting device, which does not require a positive temperature coefficient material, such as in U.S. Pat. No. 5,64,881, as discussed hereinafter.

The solid-state switch 20 comprises any appropriate high-powered solid-state switching device. As illustrated in FIG. 1, the solid-state switch 20 is represented as a gate turn-off thyristor 30 (GTO). However, this is merely exemplary of an appropriate high-powered solid-state switching device, which is within the scope of the invention. For example, but not limiting of the invention, the solid-state switch 20 comprises at least one of a MOS-controlled thyristor (MCT), an insulated gate bipolar transistor (IGBT) and an appropriately configured thyristor.

The solid-state switch 20 of the current limiting system 10 has its timing controlled by a driver 25. The driver 25 may take any appropriate configuration, as long as the driver 25 can be triggered by a signal in response to predetermined condition, such as but not limited to, a short-circuit or high current event in the circuit 11 of the current limiting system 10 as discussed hereinafter. As illustrated in FIG. 1, the driver 25 comprises a gate turn-off thyristor (GTO) drive. This is merely exemplary of drivers that are within the scope of the invention.

The signal to trigger and drive the current limiting system 10 is generated by a control 27. The control 27 determines whether to generate the signal to drive the driver 25 and trigger the solid-state switch 20 of the current limiting system 10 by monitoring current. As illustrated, a monitoring lead wire 29 extends from the control 27 to a monitor location 31, which is positioned at a point prior to the circuit 11 of the current limiting system 10 breaking into a parallel arrangement. Accordingly, the control 27, as illustrated in FIG. 1, senses a predetermined condition, such as the amount of current that flows in the circuit 11 of the current limiting system 10 in a direction of arrow i.

The control 27 comprises electronic components, as known in the art, to create a signal to drive the driver 25 and trigger the solid-state switch 20 of the current limiting system 10 when a current value at monitor location 31 increases above a predetermined threshold value. Alternatively, as embodied by the invention, the control 27 can generate a signal to drive the driver 25 and trigger the solid-state switch 20 of the current limiting system 10 when a current exhibits a predetermined characteristic, such as but not limited to a certain predetermined rate of increased flow.

Further, as embodied by the invention, the control 27 can generate a signal to drive the driver 25 and trigger the solid-state switch 20 when a specified predetermined threshold behavior is observed, for example, a voltage across the main contacts 12 and 14 has a particular value. Also, the control 27, as embodied by the invention, can generate a signal to drive the driver 25 and trigger the solid-state switch 20 when a specified predetermined threshold behavior is observed across the current limiting device 18. Furthermore, the control 27, as embodied by the invention, can also generate a signal to drive the driver 25 and trigger the solid-state switch 20 by monitoring current passage through either one of the two parallel sides 110 and 111 of the current limiting system 10 or both parallel sides 110 and 111.

In the illustrated embodiment, the control 27 is implemented as a single special purpose integrated circuit, such as ASIC, having a main or central processor section for overall, system-level control, and separate sections dedicated to performing various different specific combinations, functions and other processes under control of the central processor section. It will be appreciated by those skilled in the art that the controller can also be implemented using a variety of separate dedicated or programmable integrated or other electronic circuits or devices, such as hardwired electronic or logic circuits including discrete element circuits or programmable logic devices, such as PLDs, PALs, PLAs or the like. The controller can also be implemented using a suitably programmed general-purpose computer, such as a microprocessor or microcontroller, or other processor device, such as a CPU or MPU, either alone or in conjunction with one or more peripheral data and signal processing devices. In general, any device or similar devices on which a finite state machine capable of implementing the flow charts, as illustrated in the application, can be used as the controller. As shown a distributed processing architecture is a preferred for maximum data/signal processing capability and speed.

Figure 2:
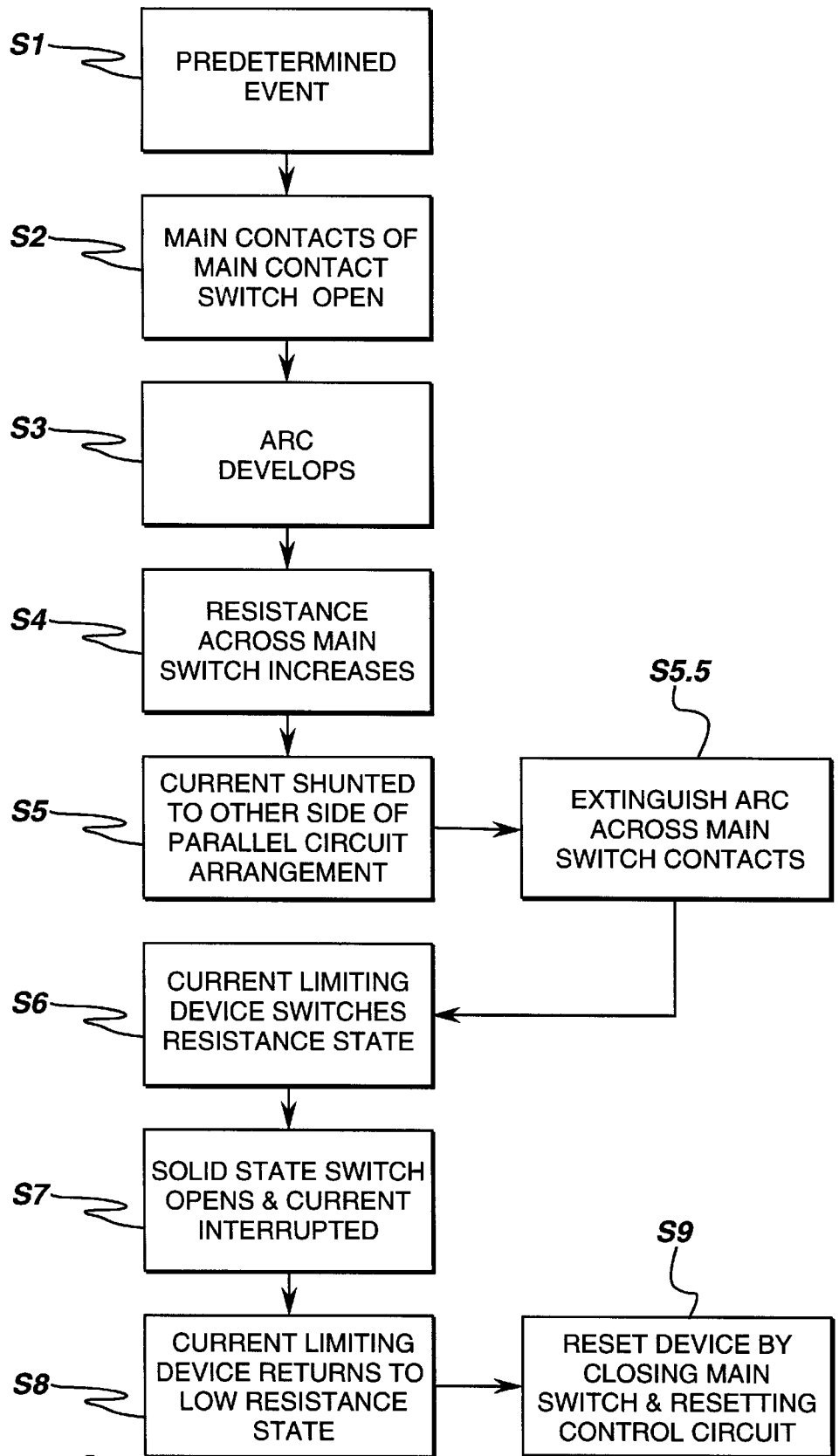
FIG. 2 is a flowchart for operation of a current limiting system, as embodied by the invention.

The operation of the current limiting system 10 will now be discussed, with reference to FIGS. 1 and 2. Under normal operating conditions, most of the current in the circuit 11 of the current limiting system 10 flows through the main contact switch 16. However, when a predetermined event, such as at least one of a high current event and short circuit event (hereinafter "event") occurs in step S1, the main contacts 12 and 14 of the main contacts switch 16 begin to open, in step S2. An arc then develops across a gap formed across the contacts 12 and 14 of the main contacts switch 16, in step S3. In step S4, the opening of the main switch contacts and the formation of the arc increases the resistance in that side of the current limiting system 10.

Next at step S5, the current is rapidly shunted away from the main switch side and flows through the series connection side 111 of the circuit 11 of the current limiting system 10. At step S5.5, the commutation of current away from the main switch contacts of the circuit combined with the increasing gap between the contacts of the main switch rapidly extinguishes the arc between the main switch contacts and an interruption of the current flow through the main switch side of the circuit occurs. Thus, current flows to the series side of the circuit 111.

At step S6, the current limiting device 18 switches its resistance state from a low resistance state to a high resistance state. This switch of resistance state limits the current passing through the current limiting system 10. The solid-state switch 20 is then driven by driver 25 and opens under control of the control 27 in step S7, thereby completing the interruption of current flow in the current limiting system 10. The current limiting device 18 then returns to its low resistance state, in step S8. The device can then be reset for another operation, with the main switch and the series side contacts being closed and resetting the control circuit, in step S9.

Further, the current limiting system as embodied by the invention, provides a specific timing in the operation of the system. In particular, the timing of at least the current limiting device must be such that the arc between the main contacts 12, 14 of the main switch 16 is fully extinguished during the operation. Further, the timing of at least the current limiting device must be such that the arc between the main contacts 12, 14 of the main switch 16 will not re-start.

Current limiting devices, such as the current limiting device 18, are used in many applications to protect sensitive components in an electrical circuit from high fault currents. Applications range from low voltage and low current electrical circuits to high voltage and high current electrical distribution systems. An important requirement for many applications is a fast current limiting response time, alternately known as switching time, to minimize the peak fault current that develops.

Known current limiting devices are capable of limiting the current in a circuit when a high current condition occurs. One known current limiting device includes a filled polymer material that exhibits what is commonly referred to as a PTCR (positive-temperature coefficient of resistance), also known as a PTC effect. U.S. Pat. No. 5,382,938, U.S. Pat. No. 5,313,184, and European Published Patent Application No. 0,640,995 A1 each describes electrical devices relying on PTC behavior. The unique attribute of the PTCR or PTC effect is that at a certain switch temperature the PTCR material undergoes a transformation from a basically conductive material to a basically resistive material. In some of these prior current limiting devices, the PTCR material (typically polyethylene loaded with carbon black) is placed between pressure contact electrodes.

In operation, current limiting devices are placed in a circuit to be protected. Under normal circuit conditions, the current limiting device is in a highly conducting state. When a high current condition occurs, the PTCR material heats up through resistive heating until the temperature reached the "switch temperature." At this point, the PTCR material resistance changes to a high resistance state and the high current condition current is limited. When the high current condition is cleared, the current limiting device cools down over a time period, which may be a long time period, to below the switch temperature and returns to the highly conducting state. In the highly conducting state, the current limiting device is again capable of switching to the high resistance state in response to future high current condition events.

U.S. Pat. No. 5,614,881, to Duggal et al., issued Mar. 25, 1997, the entire contents of which are herein incorporated by reference, discloses a current limiting device. This current limiting device relies on a composite material and an inhomogeneous distribution of resistance structure, and does not rely on a PTC effect.

Known current limiting devices comprise electrodes, electrically conductive composite material, a low pyrolysis or vaporization temperature polymeric binder and an electrically conducting filler, combined with an inhomogeneous distribution of resistance structure. The switching action of these current limiting devices occurs when joule heating of the electrically conducting filler in the relatively higher resistance part of the composite material causes sufficient heating to cause pyrolysis or vaporization of the binder.

It is believed that the advantageous results of the invention are obtained because, during a high current event, adiabatic resistive heating of the thin layer leads to rapid thermal expansion and gas evolution from the binding material in the high current multiple use current limiting device. This rapid thermal expansion and gas evolution lead to a partial or complete physical separation of the current limiting device at the selected thin layer, and produce a higher over-all device resistance to electric current flow. Therefore, the current limiting device limits the flow of current through the current path.

When the high current event is cleared externally, it is believed that the current limiting device regains its low resistance state due to the compressive pressure built into the current limiting device allowing thereby electrical current to flow normally. The current limiting device, as embodied by the invention, is reusable for many such high current event conditions, depending upon such factors, among others, as the severity and duration of each high current event.

Accordingly, as embodied by the invention, a current limiting system 10 is provided so that current flow through the current limiting system 10 is prevented after a predetermined event, such as but not limited to a short circuit. Once a current limiting device 18 of the current limiting system 10 returns to the low resistance state and the accompanying solid state switch 20 and main contacts are closed, the current limiting system 10 is ready for reuse.

While the embodiments described herein are preferred, it will be appreciated from the specification that various combinations of elements, variations or improvements therein may be made by those skilled in the art that are within the scope of the invention.

What is claimed is:

1. A current limiting system for a circuit, the current limiting system comprising:

at least one main switch, the at least one main switch comprising first and second main switch contacts and a contactor that connects the first and second main switch contacts;

at least one current limiting device, the at least one current limiting device comprising at least one polymer current limiting device;

at least one solid-state switch, the at least one solid-state switch and the at least one main switch being mechanically unconnected;

the at least one current limiting device and the at least one solid-state switch being arranged in series on a series side of the circuit, and the at least one main switch being on a main switch side of the circuit and arranged in parallel with the series side of the circuit;

a control that senses a predetermined condition of the circuit, the control operably connected with the at least one solid state switch to open and close the at least one solid state switch;

wherein under normal operating conditions, substantially all current in the current limiting system flows through the at least one main switch side of the circuit, and when the predetermined condition is sensed by the control the main switch opens, and the resistance increases in a main switch side of the circuit so current flows to the series side of the current limiting system, where the current limiting device switches state from a low resistance state to a high resistance state to limit the current passing through the current limiting system and the control signals the solid-state switch to open, thereby interrupting current flow through the circuit of the current limiting system.

2. The system according to claim 1, wherein as the main contacts of the main contacts switch open to create a gap between the main contacts, an arc develops between the first and second contacts of the main switch, the arc comprising a higher resistance than the series side of the circuit and being extinguished by at least one of current flowing away from the main switch contacts and an increasing gap between the main switch contacts.

3. The system according to claim 1, the control senses the predetermined condition of the circuit at a point prior to the parallel arrangement of the series side and the main switch side of the circuit.

4. The system according to claim 1, the predetermined condition comprising a high current event.

5. The system according to claim 1, the predetermined condition comprising a short circuit.

6. The system according to claim 1, the predetermined condition comprising at least one predetermined condition selected from the group consisting of:

a predetermined amount of current flowing in the circuit; a predetermined current value at a location prior to the parallel arrangement of the series side and the main switch side of the circuit; current in the circuit exhibiting a certain predetermined rate of increased flow; a predetermined threshold voltage across the main contacts; a predetermined threshold voltage across the current limiting device; and a predetermined current passing through at least one of the at least one main switch side of the circuit and the series side of the circuit.

7. The system according to claim 1, the at least one solid-state switch comprises at least one solid state switch selected from the group consisting of:

a gate turn-off thyristor (GTO); a MOS-controlled thyristor (MCT), an insulated gate bipolar transistor (IGBT) and an appropriately configured thyristor.

8. The system according to claim 1, the at least one solid-state switch comprises a gate turn-off thyristor (GTO).

9. The system according to claim 1, wherein the at least one polymer current limiting device relies on at least one of pryolysis, vaporization, thermal expansion and gas evolution to switch from a low resistance state to a high resistance state.

10. The system according to claim 1, wherein the at least one polymer current limiting device relies on a PTC effect.

11. The system according to claim 1, further comprising at least one driver, the at least one driver operably connected to the control to receive a signal to drive the at least one solid-state switch into one of a solid state switch closed position and a solid state switch open position.

12. A method for limiting a current in a current limiting system, the current limiting system comprising a circuit; at least one main switch, where the at least one main switch comprises first and second main switch contacts and a contactor that connects the first and second main switch contacts; at least one current limiting device, the at least one current limiting device comprising at least one polymer current limiting device; at least one solid-state switch, where the at least one solid-state switch and the at least one main switch are mechanically unconnected; the at least one current limiting device and the at least one solid-state switch are arranged in series on a series side of the circuit, and the at least one main switch being on a main switch side of the circuit and arranged in parallel with the series side of the circuit; and a control that senses a predetermined condition of the circuit, where the control is operably connected with the at least one solid state switch to open and close the at least one solid state switch; the method comprising:

opening the main switch when a predetermined event occurs;

increasing the resistance in the main switch side of the current limiting system;

shunting the current to pass through the series side;

switching the current limiting device resistance state from a low resistance state to a high resistance state to limit current passing through the current limiting system;

sensing the predetermined condition by the control;

driving the solid-state under control of the control upon sensing of the predetermined condition to complete interruption of current flow in the current limiting system; and returning the current limiting device to the low resistance state, with the solid state switch and the main switch closed, so that current then flows.

13. The method according to claim 12, further comprising developing an arc between the first and second contacts of the main switch when the main switch is opened, providing a gap between main contacts of the main contact switch, wherein as the main contacts of the main contacts switch open to provide the gap, an arc develops between the first and second contacts of the main switch, and extinguishing the arc by at least one of current flowing away from the main switch contacts and an increasing the gap between the main switch contacts.

14. The method according to claim 12, further comprising sensing the predetermined condition of the circuit at a point prior to the parallel arrangement of the series side and the main switch side of the circuit.

15. The method according to claim 12, the predetermined condition comprising at least one predetermined condition selected from the group consisting of:

a high current event; a short circuit; a predetermined amount of current flowing in the circuit; a predetermined current value at a location prior to the parallel arrangement of the series side and the main switch side of the circuit; current in the circuit exhibiting a certain predetermined rate of increased flow; a predetermined threshold voltage across the main contacts; a predetermined threshold voltage across the current limiting device; and a predetermined current passing through at least one of the at least one main switch side of the circuit and the series side of the circuit.

16. The method according to claim 12, wherein the at least one polymer current limiting relies on at least one of pryolysis, vaporization, thermal expansion and gas evolution to switch from a low resistance state to a high resistance state.

17. The method according to claim 12, wherein the at least one polymer current limiting device relies on a PTC effect.

* * * * *